(12) United States Patent
Tamari

(10) Patent No.: US 10,897,638 B2
(45) Date of Patent: Jan. 19, 2021

(54) GENERATION APPARATUS, GENERATION METHOD, AND NON-TRANSITORY COMPUTER READABLE STORAGE MEDIUM

(71) Applicant: YAHOO JAPAN CORPORATION, Tokyo (JP)

(72) Inventor: Bungo Tamari, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 457 days.

(21) Appl. No.: 15/057,492

(22) Filed: Mar. 1, 2016

(65) Prior Publication Data

US 2016/0309223 A1 Oct. 20, 2016

(30) Foreign Application Priority Data

Apr. 15, 2015 (JP) .................................. 2015-083598

(51) Int. Cl.
| | |
|---|---|
| *H04N 21/25* | (2011.01) |
| *H04N 21/431* | (2011.01) |
| *H04N 21/45* | (2011.01) |
| *H04N 21/258* | (2011.01) |
| *H04N 21/81* | (2011.01) |
| *H04N 21/845* | (2011.01) |
| *H04N 21/8549* | (2011.01) |

(52) U.S. Cl.
CPC ..... *H04N 21/252* (2013.01); *H04N 21/25891* (2013.01); *H04N 21/4312* (2013.01); *H04N 21/4532* (2013.01); *H04N 21/812* (2013.01); *H04N 21/8456* (2013.01); *H04N 21/8549* (2013.01)

(58) Field of Classification Search
CPC ............. H04N 21/252; H04N 21/4312; H04N 21/4532; H04N 21/25891; H04N 21/812; H04N 21/8456; H04N 21/8549
See application file for complete search history.

(56) References Cited

U.S. PATENT DOCUMENTS 9,465,435 B1 * 10/2016 Zhang ........................ G06F 3/01
2008/0092159 A1 4/2008 Dmitriev et al.
(Continued)

FOREIGN PATENT DOCUMENTS

| JP | 2001-238175 A | 8/2001 |
|---|---|---|
| JP | 2003-178178 A | 6/2003 |

(Continued)

OTHER PUBLICATIONS

Feb. 27, 2018 Office Action issued in Japanese Patent Application No. 2016-195386.

*Primary Examiner* — Yassin Alata
(74) *Attorney, Agent, or Firm* — Oliff PLC

(57) ABSTRACT

A generation apparatus according to an embodiment includes an acquiring unit and a generating unit. The acquiring unit acquires information on usage of a moving image content used via a partial moving image that is used as a key image of the moving image content in a terminal device that is a distribution destination of the partial moving image. The generating unit generates a partial moving image corresponding to the moving image content on the basis of the information acquired by the acquiring unit.

9 Claims, 11 Drawing Sheets

(56) References Cited

U.S. PATENT DOCUMENTS

| | | | |
|---|---|---|---|
| 2010/0083115 A1* | 4/2010 | Park | H04N 21/4312 715/721 |
| 2011/0023060 A1 | 1/2011 | Dmitriev et al. | |
| 2012/0084813 A1 | 4/2012 | Dmitriev et al. | |
| 2014/0082643 A1 | 3/2014 | Dmitriev et al. | |
| 2015/0163536 A1* | 6/2015 | Han | H04N 21/632 725/45 |
| 2015/0302428 A1* | 10/2015 | Lebrecht | G06F 3/015 725/10 |
| 2016/0103561 A1* | 4/2016 | Lee | G06F 3/0482 715/716 |

FOREIGN PATENT DOCUMENTS

| | | |
|---|---|---|
| JP | 2007-104439 A | 4/2007 |
| JP | 2010-130051 A | 6/2010 |
| JP | 2013-258746 A | 12/2013 |

\* cited by examiner

FIG.7

| MOVING IMAGE CONTENT ID | MOVING IMAGE THUMBNAIL ID | MOVING IMAGE CONTENT USAGE ||||| ATTRIBUTE-BASED USAGE ||
|---|---|---|---|---|---|---|---|---|
| | | VIEWING START RATE | COMPLETION RATE | BOOKMARK RATE | ... | USER ATTRIBUTE | SELECTION RATE |
| ... | ... | ... | ... | ... | ... | ... | ... |
| C11 | T11 | 13.0 | 7.0 | 1.0 | ... | U11 | 22.0 |
| | | | | | | U12 | 13.0 |
| | | | | | | U13 | 8.0 |
| | | | | | | U14 | 12.0 |
| | T12 | 17.0 | 6.0 | 0.8 | ... | U11 | 38.0 |
| | T13 | 5.0 | 1.0 | 0.1 | ... | U11 | 10.0 |
| | ... | ... | ... | ... | ... | ... | ... |
| ... | ... | ... | ... | ... | ... | ... | ... |

123

| USER ID | SOCIAL GRAPH ATTRIBUTE | ... |
|---|---|---|
| ... | .. | ... |
| U21 | AAA | ... |
| U22 | BBB | ... |
| U23 | CCC | ... |
| U24 | BBB | ... |
| U25 | AAA | ... |
| U26 | AAA | ... |
| ... | ... | ... |

GENERATION APPARATUS, GENERATION METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2015-083598 filed in Japan on Apr. 15, 2015.

BACKGROUND OF THE INVENTION

1. Field of the Invention

The present invention relates to a generation apparatus, a generation method, and a non-transitory computer storage medium having stored therein a generation program.

2. Description of the Related Art

In recent years, with the rapid spread of the Internet, various services are provided over a network. As one of the services, a moving image distribution service is known. A provider of the moving image distribution service distributes various moving images in accordance with requests from users.

In some cases, the provider of the moving image distribution service may distribute an advertisement content together with a moving image. In the service as described above, there has been proposed a technology related to a content viewing system that can appropriately distribute information for promotion and advertising to a user who is a viewer (for example, Japanese Laid-open Patent Publication No. 2007-104439).

Furthermore, to utilize a moving image, there has been proposed a technology in which an individual optimal distribution list (program list) is generated for an individual viewer and a content that matches the taste, mood, or feelings of the viewer is distributed or presented (for example, Japanese Laid-open Patent Publication No. 2010-130051). Moreover, there has been proposed a technology in which when an information recording medium with recorded moving image contents is played, moving image thumbnails corresponding to the moving image contents are displayed in order to allow a viewer to recognize the contents of moving images or to view desired moving image data (for example, Japanese Laid-open Patent Publication No. 2001-238175).

However, in the above-described conventional technology, it is not always possible to encourage a user to view a distributed content. For example, in the case of a commercial moving image content, such as a movie, a partial moving image showing a summary to promote viewing of the moving image content may be generated. However, it may be difficult to encourage a user to view the moving image content depending on the contents of the partial moving image.

Furthermore, the moving image content distributed by the moving image distribution service is not limited to a commercial moving image content, such as a movie. A partial moving image showing a summary is not generated for many of non-commercial moving image contents, and therefore, the moving image content is introduced by using a still image thumbnail or the like in which a title of the moving image content is displayed. It is difficult for a viewer to determine whether to view the moving image content on the basis of limited information, such as the still image thumbnail. Consequently, there may be a case in which viewing of the moving image content in the moving image distribution service is not encouraged.

SUMMARY OF THE INVENTION

It is an object of the present invention to at least partially solve the problems in the conventional technology.

A generation apparatus according to the present application includes an acquiring unit that acquires information on usage of a moving image content corresponding to a partial moving image used as a key image of the moving image content in a terminal device that is a distribution destination of the partial moving image, and a generating unit that generates a partial moving image corresponding to the moving image content on the basis of the information acquired by the acquiring unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a diagram illustrating an example of a usage storage unit according to the embodiment;

DETAILED DESCRIPTION OF THE PREFERRED EMBODIMENTS

Figure 1:
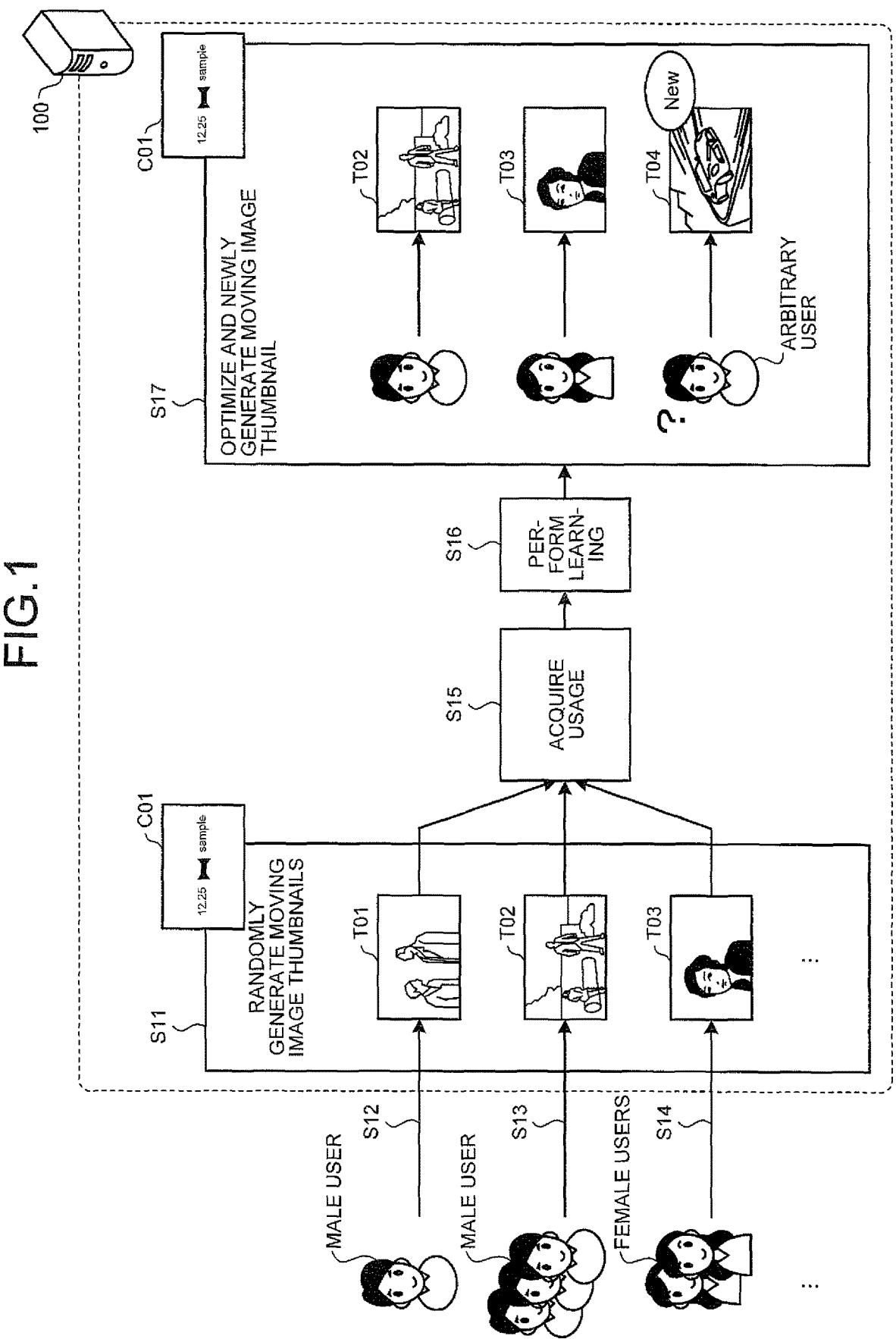
FIG. 1 is a diagram illustrating an example of a generation process according to an embodiment.

Modes (hereinafter, referred to as "embodiments") for carrying out a generation apparatus, a generation method, and a generation program according to the present application will be described in detail below with reference to the drawings. The generation apparatus, the generation method, and the generation program of the present application are not limited by the embodiments. The embodiments may be combined appropriately as long as the processes do not conflict with each other. In each of the embodiments below, the same components will be denoted by the same reference numerals and symbols, and the same explanation will not be repeated.

1. Example of Generation Process

First, an example of a generation process according to an embodiment will be described with reference to FIG. 1. FIG. 1 is a diagram illustrating an example of the generation process according to the embodiment. FIG. 1 illustrates an example in which a generation apparatus 100 that performs the generation process according to the embodiment performs a process of generating a moving image thumbnail as a key image of a moving image content.

The generation apparatus 100 is a server device that stores therein a moving image content used in a moving image distribution service. The moving image distribution service is a service that distributes a moving image content for a price or for free to a user who requests the moving image content. The moving image distribution service is provided via a moving image distribution site, for example. The generation apparatus 100 clips out a part of the moving image content to generate a partial moving image (hereinafter, described as a "moving image thumbnail") used as a key image of the moving image content. Then, the generation apparatus 100 acquires information on a user who uses the moving image distribution service (hereinafter, the information is described as "user information") or information on usage of the moving image distribution service used by the user, and performs an appropriate matching process on the user and a moving image thumbnail to be presented. Alternatively, the generation apparatus 100 generates a moving image thumbnail on the basis of the acquired information. In the following, an example of the process of generating a moving image thumbnail by the generation apparatus 100 will be described in accordance with the flow.

First, the generation apparatus 100 randomly generates a plurality of moving image thumbnails to be associated with an already-stored moving image content. For example, the generation apparatus 100 generates a moving image thumbnail by clipping out a part (for example, 10 seconds) of a moving image content at an arbitrary position. In the example in FIG. 1, the generation apparatus 100 generates, for a moving image content C01, moving image thumbnails T01, T02, and T03 clipped out at random positions (Step S11).

If a user accesses the moving image distribution site, the generation apparatus 100 distributes the generated moving image thumbnails together with a list of moving image contents as distribution candidates. An example of display of the moving image thumbnails will be described below with reference to FIG. 2.

Figure 2:
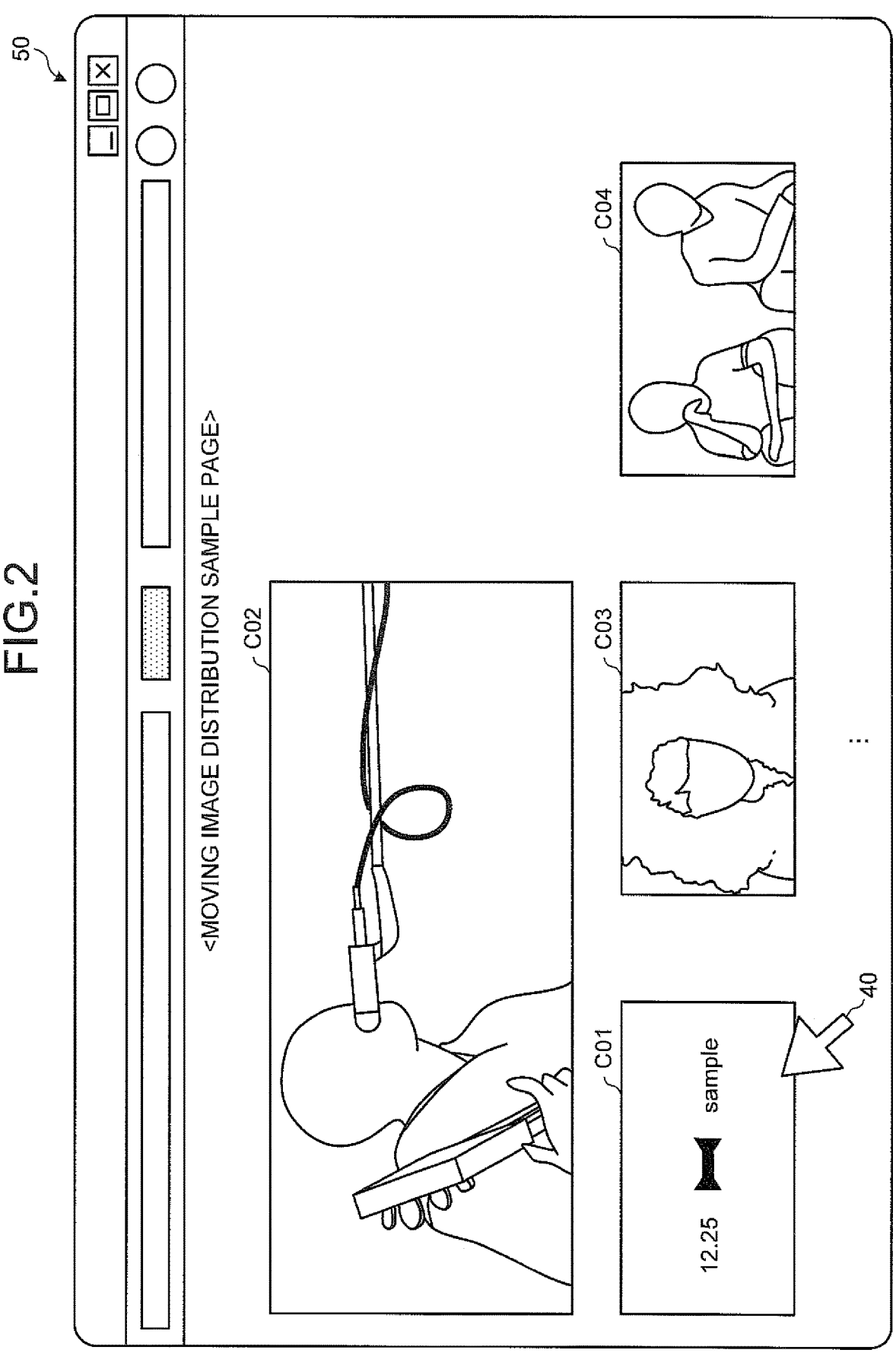
FIG. 2 is a diagram for explaining an example of a moving image distribution site according to the embodiment.

FIG. 2 is a diagram for explaining an example of a moving image distribution site according to the embodiment. FIG. 2 illustrates an example of a moving image distribution site that is displayed on a web browser 50 of a user terminal 10 (not illustrated in FIG. 1 and FIG. 2) when a user accesses the moving image distribution site. As illustrated in FIG. 2, the moving image distribution site displays still image thumbnails of moving image contents C01 to C04 or the like that are distribution candidates. In general, the user checks the still image thumbnails of the moving image contents C01 to C04 or the like, selects a desired moving image content with a mouse cursor 40, and receives distribution of the moving image content.

Meanwhile, the generation apparatus 100 displays a moving image thumbnail as a key image of the moving image content. For example, if the user moves the mouse cursor 40 to a position overlapping the moving image content C01 (so-called a mouseover state) as illustrated in FIG. 2, any of the moving image thumbnails T01 to T03 associated with the moving image content C01 is displayed (played) on the user terminal 10. That is, the user can check a part of the contents included in the moving image content C01 before the moving image content C01 is distributed. As described above, according to the generation apparatus 100, the user can directly recognize the contents of the moving image content by the moving image thumbnail, rather than predicting the contents of the moving image content from the still image thumbnail. Therefore, the user can easily select a desired moving image content.

Referring back to FIG. 1, the description is continued. If the user accesses the moving image distribution site, the generation apparatus 100 randomly distributes the moving image thumbnails T01 to T03 as the key images of the moving image content C01 to the user terminal 10. Then, the generation apparatus 100 recognizes the moving image thumbnail T01, T2, or T03 viewed by the user and recognizes usage, such as whether the user has requested distribution of the moving image content C01 when the user has viewed the moving image thumbnail.

For example, in FIG. 1, it is assumed that a certain male user has accessed the moving image distribution site, viewed the moving image thumbnail T01, and requested distribution of the moving image content C01 (Step S12). A request for distribution of the moving image content C01 in this case is provided when, for example, the user performs a mouse click on an area in which the moving image thumbnail T01 is displayed while the moving image thumbnail T01 is played.

It is also assumed that different male users have viewed the moving image thumbnail T02 and requested distribution of the moving image content C01 (Step S13). In the example in FIG. 1, it is assumed that the number of users who have viewed the moving image thumbnail T02 and requested distribution of the moving image content C01 is greater than the number of users who have viewed the moving image thumbnail T01 and requested distribution of the moving image content C01.

It is also assumed that female users have viewed the moving image thumbnail T03 and requested distribution of the moving image content C01 (Step S14). That is, in the example in FIG. 1, it is observed that the number of male users who have viewed the moving image thumbnails T01 and T02 and requested distribution of the moving image content C01 is greater than the number of female users who have done the same, and the number of users who have viewed the moving image thumbnail T02 and requested distribution of the moving image content C01 is greater than the number of users who have viewed the moving image thumbnail T01 and requested distribution of the moving image content C01. It is also observed that the number of female users who have viewed the moving image thumbnail T03 and requested distribution of the moving image content C01 is greater than the number of male users who have done the same.

The generation apparatus 100 acquires information on the usage for each user as described above (Step S15). The information on the usage includes user information on a user who has accessed the moving image distribution site, a rate at which a moving image content is selected because of the moving image thumbnail as described above, and a correlation with an attribute of the user. For example, the generation apparatus 100 acquires information on the user or information on the usage of the moving image content (in other words, operation performed on a browser of the user terminal 10) on the basis of a cookie or the like transmitted from the user terminal 10. The user information is, for example, user attribute information, or the like. Specifically, the user information includes age, gender, and the like of the user.

Subsequently, the generation apparatus 100 performs a predetermined learning process on the basis of the acquired information (Step S16). The generation apparatus 100 evaluates a score for each of the distributed moving image thumbnails and determines whether each of the moving image thumbnails is effective for the moving image distribution service, which will be described in detail later. Based on this, the generation apparatus 100 learns a model that can optimize a moving image thumbnail to be distributed for each user who uses the moving image distribution service. Herein, optimization of the moving image thumbnail indicates distribution of a moving image thumbnail that achieves the highest appeal effect to a user at the time of distribution of a moving image thumbnail to the user. Through the optimization of the moving image thumbnail, the generation apparatus 100 can perform a process of selecting and distributing a specific moving image thumbnail, for which a transmission rate of a distribution request for a moving image content (that is, a click rate of the moving image thumbnail) is expected to be the highest, with respect to a user with a certain attribute such as a man in his twenties, for example.

The generation apparatus 100 optimizes the moving image thumbnail to be distributed, on the basis of the learning (Step S17). For example, as for a moving image thumbnail to be distributed as the key image of the moving image content C01, the generation apparatus 100 optimizes a distribution rate such that the moving image thumbnail T02 is relatively frequently distributed to male users. Furthermore, the generation apparatus 100 optimizes the distribution rate such that the moving image thumbnail T03 is relatively frequently distributed to female users.

The generation apparatus 100 may generate a new moving image thumbnail on the basis of each of the acquired information (Step S17). For example, if a score for evaluating the moving image thumbnail T01 is equal to or lower than a predetermined value, the generation apparatus 100 eliminates the moving image thumbnail T01 from distribution candidates and newly generates a moving image thumbnail T04. If the moving image distribution service is newly accessed, the generation apparatus 100 distributes the moving image thumbnail T04. For example, if a user as a distribution destination is not a user suitable for the moving image thumbnail T02 or the moving image thumbnail T03 as described above, the generation apparatus 100 selects and distributes one of the moving image thumbnails T02 to T04 for the user by using an equal distribution rate. As described above, the generation apparatus 100 may distribute the newly-generated moving image thumbnail T04 to an arbitrary user. The generation apparatus 100 repeats the process of acquiring information on the usage and repeats the learning process, thereby gradually improving the effect of the moving image thumbnail to be distributed.

As described above, the generation apparatus 100 according to the embodiment generates a moving image thumbnail that is a partial moving image used as a key image of a moving image content, from a part of the moving image content. Then, the generation apparatus 100 acquires information on the usage of the moving image content corresponding to the moving image thumbnail. Furthermore, the generation apparatus 100 optimizes selection of a moving image thumbnail to be associated with the moving image content on the basis of the acquired information on the usage or the like, and distributes the appropriate moving image thumbnail to the user. Moreover, the generation apparatus 100 newly generates a moving image thumbnail on the basis of the acquired information on the usage or the like.

As described above, the generation apparatus 100 according to the embodiment performs the process of optimizing a moving image thumbnail to be referred to when a user selects a moving image content. For example, a submitter can generate a moving image thumbnail expected to achieve an appeal effect in accordance with various user classes by using the generation apparatus 100. That is, the generation apparatus 100 selects and distributes a moving image thumbnail in which a specific user class is likely to be interested, in order to generate the interest of the user. Furthermore, the user can determine whether to use the moving image content by actually viewing the moving image thumbnail, rather than predicting the contents of the moving image content from a still image thumbnail, comments of other users, or the like. This may decrease a threshold for a user to try to view the moving image content. Consequently, the generation apparatus 100 can encourage the user to view a distributed content.

2. Configuration of Generation Processing System

Figure 3:
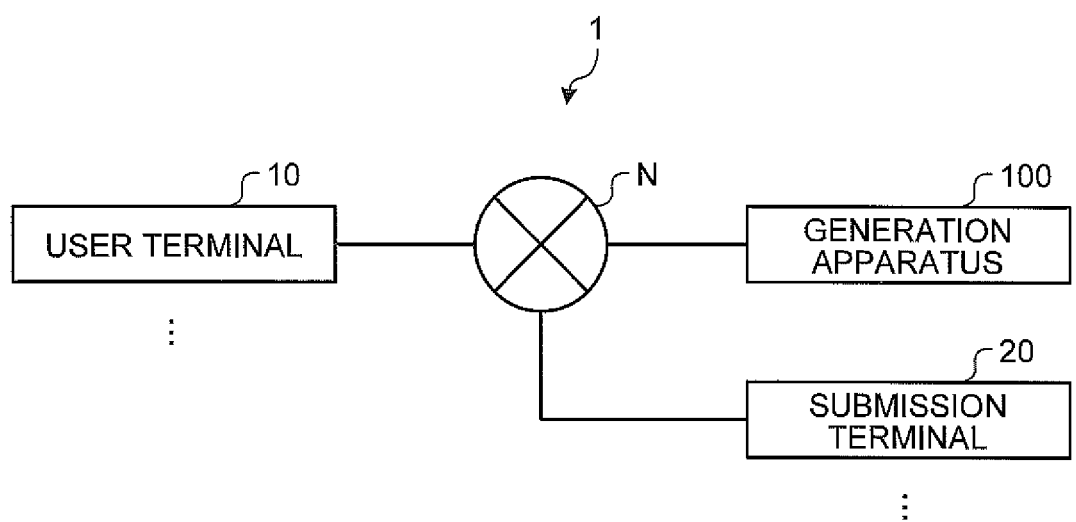
FIG. 3 is a diagram illustrating a configuration example of a generation processing system according to the embodiment.

A configuration of a generation processing system 1 including the generation apparatus 100 according to the embodiment will be described below with reference to FIG. 3. FIG. 3 is a diagram illustrating a configuration example of the generation processing system 1 according to the embodiment. As illustrated in FIG. 3, the generation processing system 1 according to the embodiment includes the user terminal 10, a submission terminal 20, and the generation apparatus 100. These apparatuses are communicably connected to one another by wire or wireless via a network N. The generation processing system 1 illustrated in FIG. 3 may include a plurality of the user terminals 10 and a plurality of the submission terminals 20.

The user terminal 10 is, for example, an information processing device, such as a desktop personal computer (PC), a notebook PC, a tablet terminal, a mobile phone, or a personal digital assistant (PDA). For example, the user terminal 10 accesses a web server (corresponding to the generation apparatus 100 in the embodiment) that provides a moving image distribution site or the like and acquires a web page related to a desired service, in accordance with operation performed by a user. The user terminal 10 displays the acquired web page on a display device (for example, a liquid crystal display).

The submission terminal 20 is an information processing apparatus used by a submitter who gives a request for a moving image content to the generation apparatus 100. The submission terminal 20 submits a moving image content to the generation apparatus 100 in accordance with operation performed by the submitter.

The generation apparatus 100 is a server device that generates a moving image thumbnail corresponding to a moving image content as described above. The generation apparatus 100 performs a process of optimizing a moving image thumbnail to be distributed, thereby encouraging the user to view the moving image content.

As described above, when distributing a moving image thumbnail, the generation apparatus 100 can identify the user terminal 10 and specify the user terminal 10 to which the moving image thumbnail is distributed. For example, it is possible to identify a user by including user identification information in a cookie exchanged between the web browser of the user terminal 10 and the generation apparatus 100. However, a user identification method is not limited to the above-described example. For example, it may be possible to set a dedicated program in the user terminal 10, and cause the dedicated program to transmit the user identification information to the generation apparatus 100.

3. Configuration of Generation Apparatus

Figure 4:
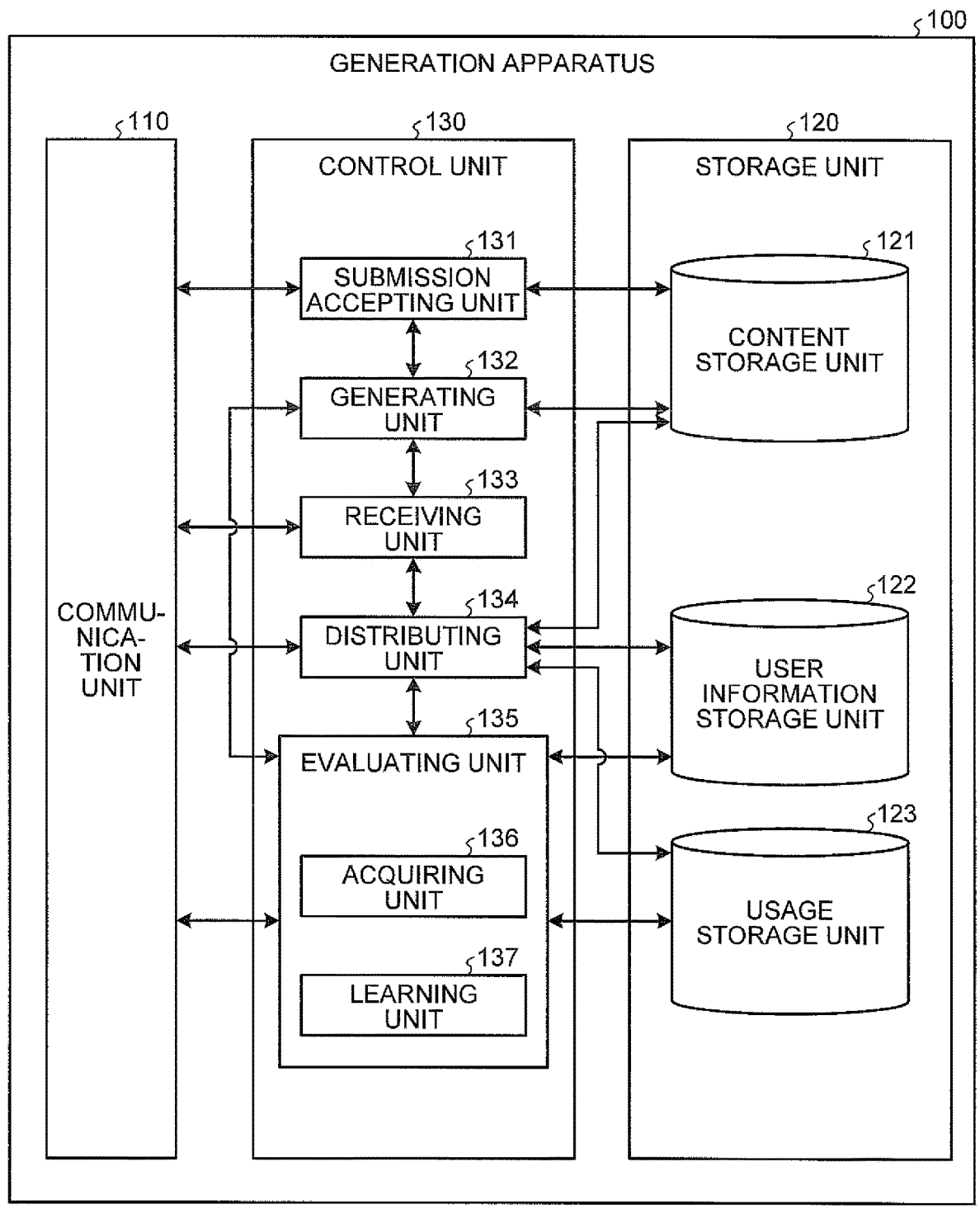
FIG. 4 is a diagram illustrating a configuration example of a generation apparatus according to the embodiment.

A configuration of the generation apparatus 100 according to the embodiment will be described below with reference to FIG. 4. FIG. 4 is a diagram illustrating a configuration example of the generation apparatus 100 according to the embodiment. As illustrated in FIG. 4, the generation apparatus 100 includes a communication unit 110, a storage unit 120, and a control unit 130. The generation apparatus 100 may include an input unit (for example, a keyboard, a mouse, or the like) for accepting various kinds of operation from an administrator or the like who uses the generation apparatus 100, or a display unit (for example, a liquid crystal display or the like) for displaying various kinds of information.

Communication Unit 110

The communication unit 110 is implemented by, for example, a network interface card (NIC) or the like. The communication unit 110 is connected to the network N by wire or wireless, and performs transmission and reception of information with the user terminal 10 and the submission terminal 20 via the network N.

Storage Unit 120

The storage unit 120 is implemented by, for example, a semiconductor memory device, such as a random access memory (RAM) or a flash memory, or a storage device, such as a hard disk or an optical disk. The storage unit 120 includes a content storage unit 121, a user information storage unit 122, and a usage storage unit 123.

Content Storage Unit 121

Figure 5:
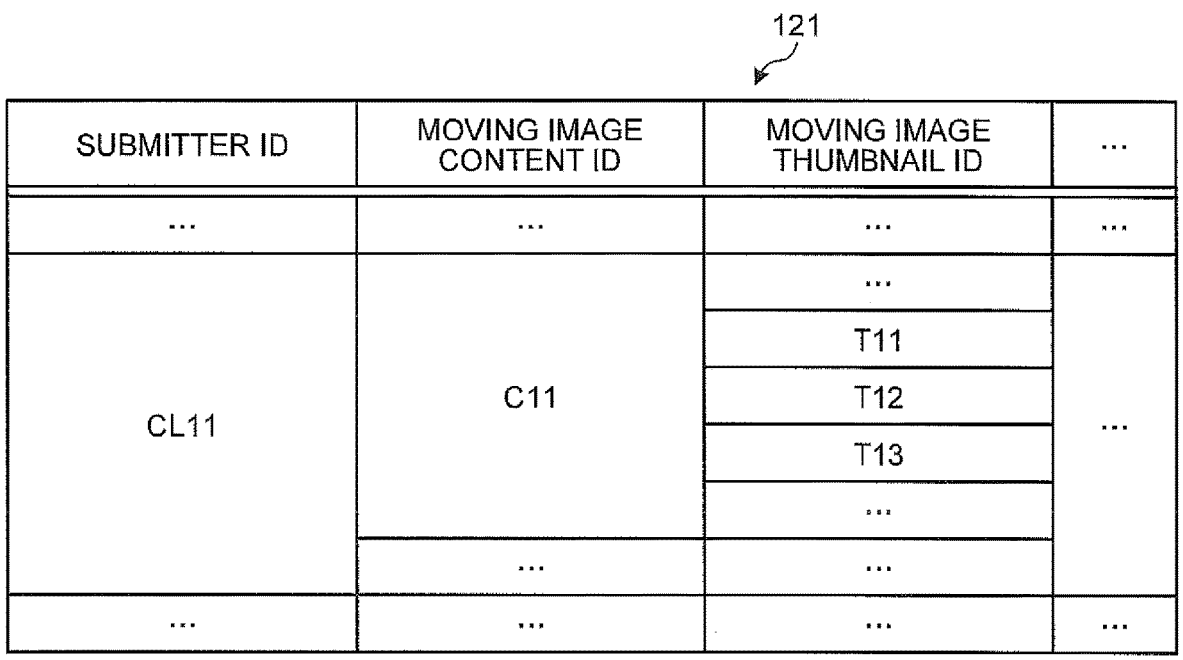
FIG. 5 is a diagram illustrating an example of a content storage unit according to the embodiment.

The content storage unit 121 stores therein information on a moving image content submitted from the submission terminal 20. An example of the content storage unit 121 according to the embodiment is illustrated in FIG. 5. FIG. 5 is a diagram illustrating the example of the content storage unit 121 according to the embodiment. As illustrated in FIG. 5, the content storage unit 121 includes items such as "submitter ID", "moving image content ID", and "moving image thumbnail ID".

The "submitter ID" indicates identification information for identifying a submitter or the submission terminal 20. The "moving image content ID" indicates identification information for identifying a moving image content submitted from a submitter to the generation apparatus 100. The "moving image thumbnail ID" indicates information for identifying a moving image thumbnail generated from a corresponding moving image content.

In the following, the identification information illustrated in FIG. 5 may be used as a reference symbol. For example, a submitter identified by a submitter ID "CL11" may be described as a "submitter CL11", a moving image content identified by a moving image content ID "C11" may be described as a "moving image content C11", and a moving image thumbnail identified by a moving image thumbnail. ID "T11" may be described as a "moving image thumbnail T11".

Specifically, in the example illustrated in FIG. 5, the submitter identified by the submitter ID "CL11" submits the moving image content identified by the moving image content ID "C11". Furthermore, in this example, the moving image thumbnails T11 to T13 are generated as moving image thumbnails corresponding to the moving image content C11.

Data of the moving image content and the moving image thumbnail actually distributed to the user terminal 10 may be stored in a certain storage server separated from the generation apparatus 100. In this case, the generation apparatus 100 specifies a moving image content or a moving image thumbnail stored in the external storage server on the basis of the moving image content ID or the moving image thumbnail ID stored in the content storage unit 121. Then, the generation apparatus 100 causes the storage server to distribute the specified moving image content or the specified moving image thumbnail to the user terminal 10.

User Information Storage Unit 122

Figure 6:
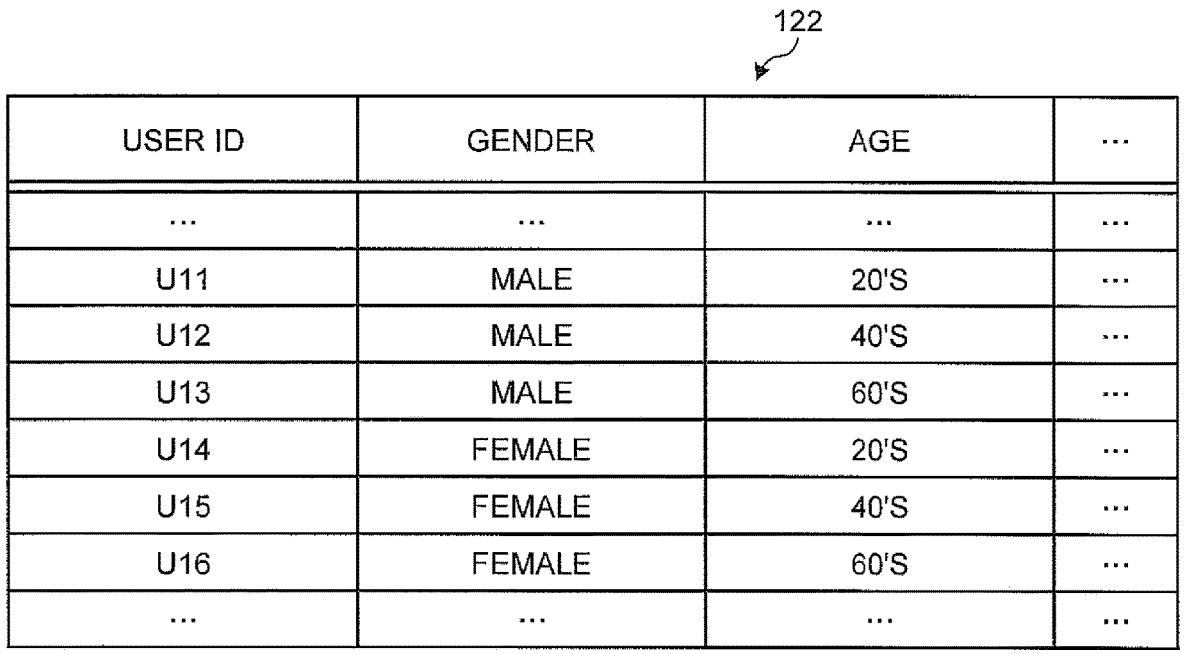
FIG. 6 is a diagram illustrating an example of a user information storage unit according to the embodiment.

The user information storage unit 122 stores therein information on a user as a distribution target of a moving image content. An example of the user information storage unit 122 according to the embodiment is illustrated in FIG. 6. FIG. 6 is a diagram illustrating the example of the user information storage unit 122 according to the embodiment. In the example illustrated in FIG. 6, the user information storage unit 122 includes items such as "user ID", "gender", and "age".

The "user ID" is identification information for identifying the user terminal 10 or a user. It is assumed that the user ID matches the reference symbol of the user who operates the user terminal 10. That is, it is assumed that the user terminal 10 identified by a user ID "U11" is a terminal device operated by a user "U11".

The "gender" indicates the gender of a user. The "age" indicates the age of a user. As illustrated in FIG. 6, an age group, such as "20's", may be indicated in the item "age", instead of a specific value.

For example, FIG. 6 illustrates an example in which the gender of the user U11 identified by the user ID "U11" is "male" and the age is "20's".

In the following description, the user includes not only an individual user but also a concept of a user class with a certain attribute. For example, the user U11 includes not only the individual user U11 but also a concept of a user group including users with the same attributes as the user U11. That is, the user U11 may indicate a group of users who belong to a category of "male" and "20's".

Although not illustrated in FIG. 6, the user information storage unit 122 may store therein behavior information on a user, such as an access history of a website or a purchase history in a shopping site. Furthermore, the user information storage unit 122 may store therein a device ID or the like as information for identifying the user terminal 10 itself. The device ID indicates identification information recorded in the terminal device itself, which is different from the user ID. The user information storage unit 122 may include, as user attribute information, items such as "name" indicating the name of a user, "annual income" indicating the annual income of a user, and "preference" indicating the preference of a user.

Usage Storage Unit 123

The usage storage unit 123 stores therein information on the usage of a moving image content. An example of the usage storage unit 123 according to the embodiment is illustrated in FIG. 7. FIG. 7 is a diagram illustrating the example of the usage storage unit 123 according to the embodiment. In the example illustrated in FIG. 7, the usage storage unit 123 includes items such as "moving image content ID", "moving image thumbnail ID", "moving image content usage", and "attribute-based usage". Furthermore, the item "moving image content usage" includes items such as "viewing start rate", "completion rate", and "bookmark rate". Moreover, the item "attribute-based usage" includes items such as "user attribute" and "selection rate".

The "moving image content ID" and the "moving image thumbnail ID" correspond to the items stored in the content storage unit 121 illustrated in FIG. 5.

The "moving image content usage" indicates information on a situation in which a moving image content is used in the moving image distribution site.

The "viewing start rate" indicates a rate at which a user who has viewed a moving image thumbnail starts to view a moving image content corresponding to the moving image thumbnail (that is, the user clicks the moving image thumbnail and sends a distribution request for the moving image content).

The "completion rate" indicates a rate at which a user views a moving image content to the end. The "bookmark rate" indicates a rate at which a user bookmarks a moving image content.

The "attribute-based usage" indicates the usage of a moving image content corresponding to the attribute of a user. The "user attribute" indicates a group classified for each user attribute. Classifications of user attributes correspond to the classifications of the users stored in the user information storage unit 122. Specifically, the user attribute "U11" indicates attributes of "male" and "20's".

The "selection rate" indicates a rate at which viewing of a moving image content is started because of viewing of a moving image thumbnail, for each user attribute.

For example, FIG. 7 indicates that the moving image thumbnails T11 to T13 are provided as moving image thumbnails corresponding to the moving image content C11. Furthermore, the rate of users who have started to view the moving image content C11 to users who have viewed the moving image thumbnail T11 is "13.0%", the rate of users who have viewed the moving image content C11 to the end is "7.0%", and the rate of users who have bookmarked the moving image content C11 is "1.0%". Moreover, it is indicated that the moving image thumbnail T11 is viewed by the users U11 to U14, and the rates of viewing of the moving image content C11 by the respective user groups are "22.0%", "13.0%", "8.0%", and "12.0%". That is, it is indicated that the selection rate of the user U11 corresponding to "male" and "20's" among the users U11 to U14 is relatively high.

Control Unit 130

The control unit 130 is implemented by, for example, executing various programs (corresponding to an example of the generation program) stored in an internal storage device of the generation apparatus 100 by a central processing unit (CPU), a micro processing unit (MPU), or the like using a RAM as a work area. Furthermore, the control unit 130 is implemented by, for example, an integrated circuit, such as an application specific integrated circuit (ASIC) or a field programmable gate array (FPGA).

As illustrated in FIG. 4, the control unit 130 includes a submission accepting unit 131, a generating unit 132, a receiving unit 133, a distributing unit 134, an evaluating unit 135, an acquiring unit 136, and a learning unit 137, and implements or executes functions and operations of information processing as described below. The internal configuration of the control unit 130 is not limited to the configuration illustrated in FIG. 4, and any other configuration that performs the information processing as described below is applicable. Furthermore, a connection relation between the processing units of the control unit 130 is not limited to the connection relation illustrated in FIG. 4, and any other connection relation is applicable.

Submission Accepting Unit 131

The submission accepting unit 131 accepts submission of a moving image content from the submission terminal 20. The submission accepting unit 131 stores information on the submitted moving image content in the content storage unit 121 in association with the submitter ID for identifying a submitter of a submission source and the moving image content ID. If a moving image thumbnail generated by the submitter is submitted, the submission accepting unit 131 stores the moving image thumbnail generated by the submitter in association with the moving image content.

The submission accepting unit 131 may accept submission of an advertisement content that is distributed together with the moving image content in the moving image distribution service.

Generating Unit 132

The generating unit 132 generates a moving image thumbnail corresponding to a moving image content. Specifically, the generating unit 132 generates a moving image thumbnail corresponding to the moving image content by clipping out a partial moving image with a predetermined duration (for example, 10 seconds) from the moving image content accepted by the submission accepting unit 131.

Figure 8:
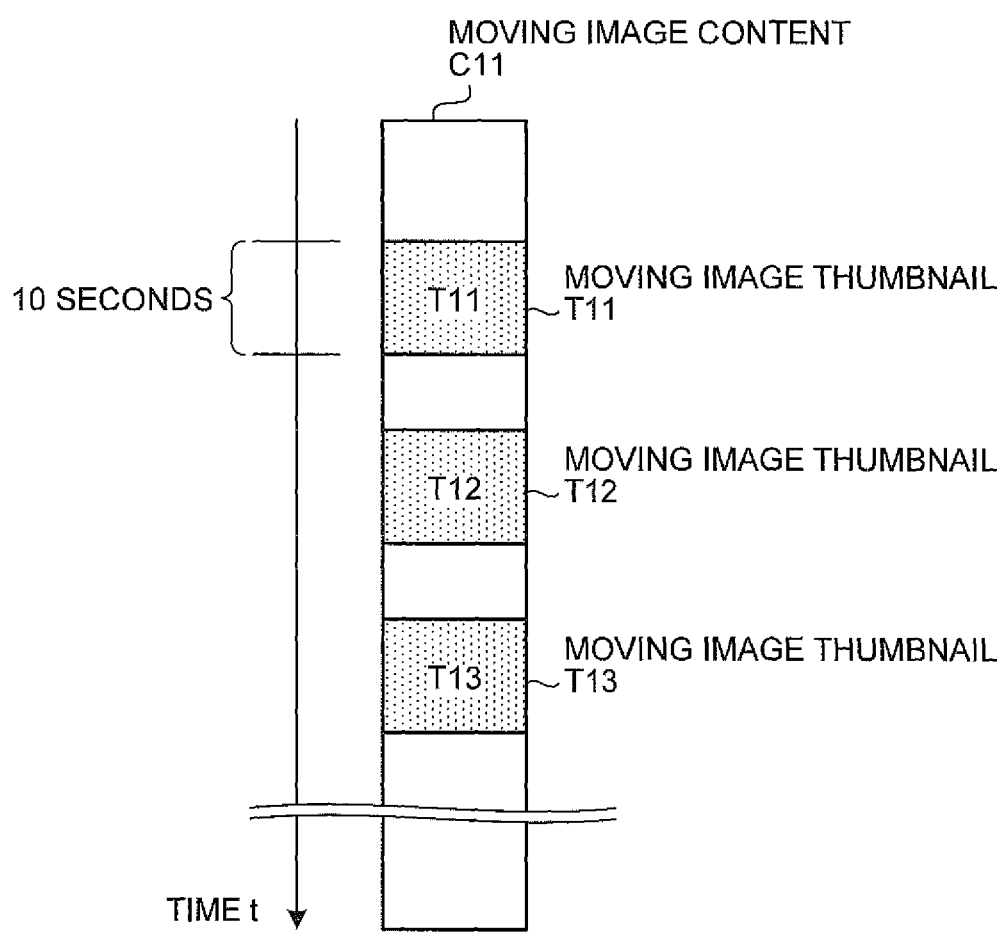
FIG. 8 is a diagram for explaining a process of generating a moving image thumbnail by a generating unit according to the embodiment.

The generation process performed by the moving image thumbnail will be descried below with reference to FIG. 8. FIG. 8 is a diagram for explaining the process of generating a moving image thumbnail by the generating unit 132 according to the embodiment. As illustrated in FIG. 8, the generating unit 132 generates moving image thumbnails by clipping out certain parts of a moving image content. In the example illustrated in FIG. 8, the generating unit 132 generates the moving image thumbnails T11, T12, and T13 clipped out at random positions, with respect to the moving image content C11. While FIG. 8 illustrates an example in which the moving image thumbnails T11, T12, and T13 are generated by clipping out non-overlapping portions, the generating unit 132 may generate a plurality of moving image thumbnails by using overlapping portions.

The generating unit 132 randomly generates a moving image thumbnail at the time immediately after the moving image content is submitted and before the moving image thumbnail corresponding to the moving image content is actually distributed, or when adequate information on the usage due to distribution is not acquired. Specifically, the generating unit 132 clips out an arbitrary position of the moving image content to generate the moving image thumbnail.

Furthermore, after the moving image thumbnail is distributed and the user uses the moving image thumbnail, the generating unit 132 generates a moving image thumbnail corresponding to the moving image content on the basis of information acquired by the acquiring unit 136 to be described later. The generating unit 132 need not always newly generate a moving image thumbnail on the basis of the information acquired by the acquiring unit 136. For example, if an adequate appeal effect can be obtained by currently-generated moving image thumbnails, the generating unit 132 need not newly generate a moving image thumbnail. In this case, the generating unit 132 can select a moving image thumbnail to be actually distributed from the already-generated moving image thumbnails. As described above, the concept of the generation process performed by the generating unit 132 includes a process of selecting an already-generated moving image thumbnail.

When newly generating a moving image thumbnail, the generating unit 132 newly generates the moving image thumbnail if a specific portion of the moving image content can achieve an appeal effect on the basis of the information acquired by the acquiring unit 136. Alternatively, the generating unit 132 performs a process of selecting a partial moving image that is available as a moving image thumbnail generated for a different purpose. The partial moving image generated for a different purpose corresponds to, for example, an advertising short video that is generated by the submitter of the moving image content in advance. If the moving image distribution site uses a system for distributing a moving image content in a divided manner, such as an HTTP live streaming (HLS) system, the moving image content is distributed to the user terminal 10 by being divided into segments (for example, a partial moving image of 10 seconds). Therefore, the generating unit 132 may perform a selection process for using the divided segments as moving image thumbnails. The appeal effect of a moving image thumbnail is determined by the degree of success in causing a user to view a moving image content by user's selection of the moving image thumbnail (for example, by operation, such as a click with a mouse, a touch gesture on a touch panel, or a voice input, by which user's intention to view can be confirmed).

Specifically, the generating unit 132 generates a moving image thumbnail on the basis of a result of the evaluation performed by the evaluating unit 135. More specifically, the generating unit 132 newly generates a moving image thumbnail on the basis of information on a behavior of the user that leads to distribution of the moving image content among behaviors of the user with respect to the moving image thumbnail. For example, it is assumed that the evaluating unit 135 to be described later obtains information indicating that a user is likely to click on a portion around a specific time point in a certain moving image thumbnail. In this case, the generating unit 132 can generate a new moving image thumbnail including the specific time point. For example, the generating unit 132 may generate a moving image thumbnail such that the specific time point is located in the center (around five seconds in an image of 10 seconds used as a moving image thumbnail), or may generate a moving image such that the specific time point is located immediately after a start point of replay. An element of the index value evaluated by the evaluating unit 135 may include not only a click rate of the moving image thumbnail, but also a completion rate of the moving image content viewed via the moving image thumbnail, the bookmark rate of the moving image content, or an exit rate of the moving image content being viewed. Therefore, the generating unit 132 may generate a moving image thumbnail such that the index value indicated by each of the above-described elements can be improved. As one example, it is assumed that there is a moving image content for which the click rate of a moving image thumbnail is high and the viewing rate of an early part is high as a result of the evaluation performed by the evaluating unit 135. In this case, the generating unit 132 generates a moving image thumbnail including a latter part as a moving image thumbnail corresponding to the moving image content. Consequently, the generating unit 132 can generate a moving image thumbnail that attracts attention of a user to an interesting portion contained in the latter part of the moving image content. As described above, the generating unit 132 generates a moving image thumbnail expected to more encourage the user to view the moving image content, by using a result of the evaluation performed by the evaluating unit 135.

Figure 9:
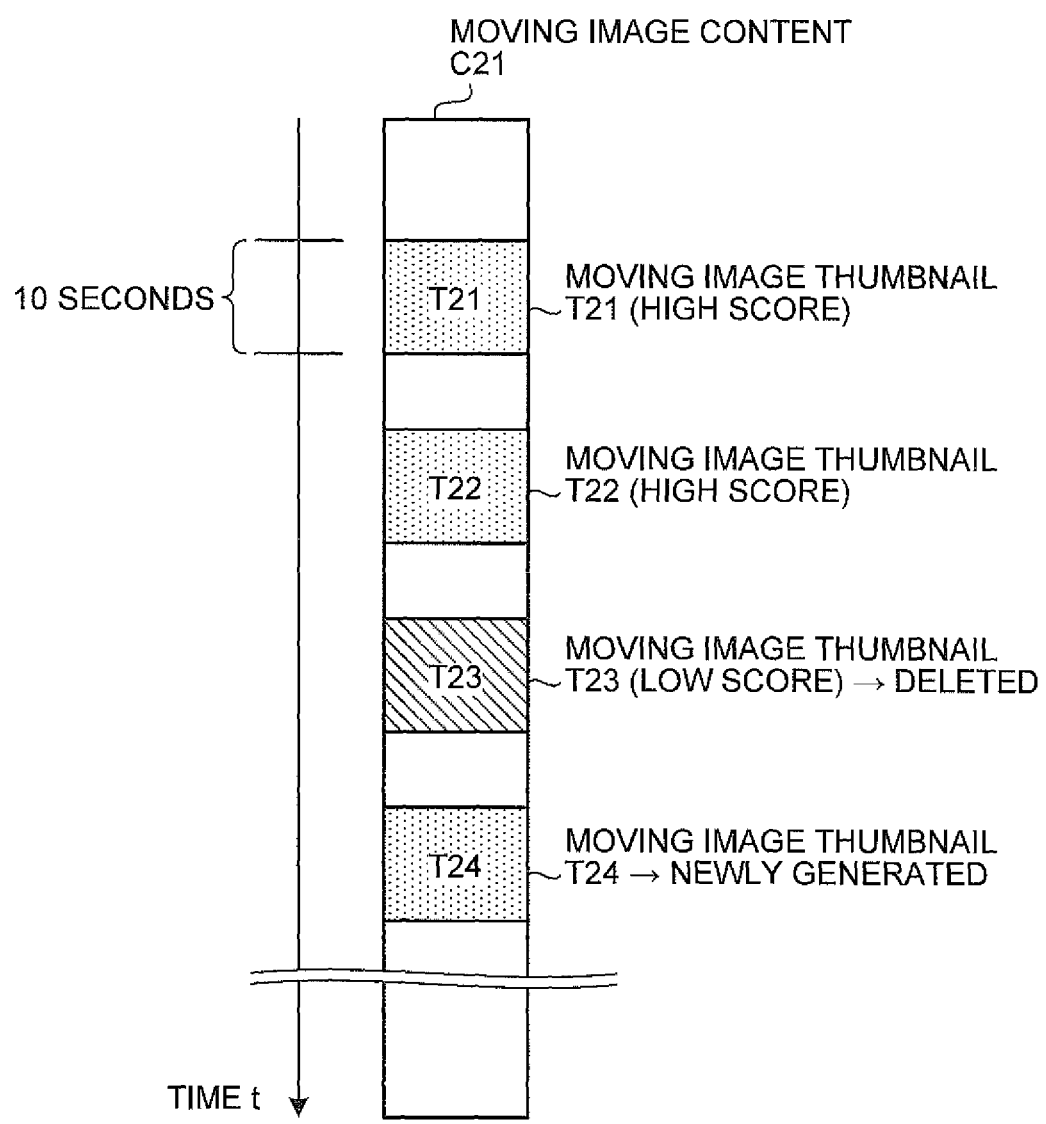
FIG. 9 is a diagram for explaining a process of generating a new moving image thumbnail by the generating unit according to the embodiment.

Furthermore, if the appeal effect of a specific moving image thumbnail has not been seen as a result of the evaluation process performed by the evaluating unit 135, the generating unit 132 may generate a new moving image thumbnail as an alternative to the moving image thumbnail. This will be described below with reference to FIG. 9. FIG. 9 is a diagram for explaining a process of generating a new moving image thumbnail by the generating unit 132 according to the embodiment.

As illustrated in FIG. 9, it is assumed that when moving image thumbnails T21 to T23 corresponding to the moving image content C21 are prepared, it is evaluated that the appeal effect of the moving image thumbnail T23 is relatively low. Specifically, it is assumed that an index value (score) indicating the appeal effect of the moving image thumbnail T23 calculated by the evaluating unit 135 is lower than a predetermined threshold. In this case, the generating unit 132 generates a new moving image thumbnail T24 by clipping out a portion different from the moving image thumbnail T23 with the relatively low score from the moving image content C21. Then, the distributing unit 134 to be described later distributes, to the user, any of the three moving image thumbnails including the newly-generated moving image thumbnail T24 instead of the moving image thumbnail T23 with the relatively low appeal effect.

Furthermore, in the above-described generation process, the generating unit 132 may generate a moving image thumbnail corresponding to each user class classified by the user attribute information, on the basis of the user information acquired by the acquiring unit 136. Specifically, the acquiring unit 136 acquires information on a point that is likely to be clicked in the moving image thumbnail or the like, for each user class. Then, the generating unit 132 generates a moving image thumbnail optimized so as to achieve the highest appeal effect for each user class.

Receiving Unit 133

The receiving unit 133 receives a distribution request for a content. Specifically, when the user terminal 10 accesses the moving image distribution site, the receiving unit 133 receives a distribution request for a content (for example, a web page or the like) related to the moving image distribution site. In other words, the receiving unit 133 receives a distribution request related to a still image thumbnail or a moving image thumbnail displayed on a top page or the like of the moving image distribution site.

Furthermore, the receiving unit 133 receives a distribution request for a moving image content that is transmitted from the user terminal 10 because of selection of the moving image thumbnail by the user. The selection of the moving image thumbnail indicates that, for example, the user has clicked the moving image thumbnail. Moreover, the receiving unit 133 may receive a distribution request for an advertisement content displayed on the moving image distribution site.

Distributing Unit 134

The distributing unit 134 distributes a content corresponding to a distribution request received by the receiving unit 133. Specifically, the distributing unit 134 distributes a submitted moving image content or a moving image thumbnail generated by the generating unit 132, in accordance with a distribution request transmitted from the user terminal 10.

For example, when the moving image distribution site is accessed, the distributing unit 134 distributes, to the user terminal 10, a still image thumbnail or a moving image thumbnail as a key image of the moving image content to be distributed. In this case, before a certain moving image content is actually distributed or when adequate information on the usage due to distribution of the certain moving image content is not acquired, the distributing unit 134 randomly selects and distributes a moving image thumbnail from among moving image thumbnails corresponding to the moving image content.

When the learning by the evaluating unit 135 has progressed, and if a correlation between the appeal effect of a moving image thumbnail to be distributed and any element is obtained, the distributing unit 134 distributes the moving image thumbnail on the basis of a result of the learning.

For example, if a correlation between the user class and the moving image thumbnail is obtained, the distributing unit 134 performs distribution at a distribution rate adjusted such that a moving image thumbnail corresponding to the user class as a distribution destination is preferentially distributed. Specifically, if it is determined that a certain moving image thumbnail is effective to a user class corresponding to "male" and "20's", the distributing unit 134 distributes the moving image thumbnail to a user class corresponding to "male" and "20's" at a relatively high rate.

Data of a content to be actually distributed need not be stored in the storage unit 120 of the generation apparatus 100 as described above. For example, the distributing unit 134 may transmit a control command to an externally-provided certain storage server to thereby distribute a content corresponding to a distribution request to the user terminal 10.

Evaluating Unit 135

The evaluating unit 135 includes the acquiring unit 136 and the learning unit 137, and performs a process of evaluating a content by using each of the processing units. Specifically, the evaluating unit 135 evaluates a moving image thumbnail by an index value (score) indicating an impact of the moving image thumbnail on viewing of the moving image content, on the basis of the information acquired by the acquiring unit 136.

For example, the evaluating unit 135 evaluates a moving image thumbnail by using, as a score, the degree of contribution of the moving image thumbnail to promote viewing, on the basis of the usage, such as a rate at which the distributed moving image thumbnail leads to viewing the moving image content. In this case, the evaluating unit 135 may evaluate the appeal effect of the moving image thumbnail for each user class, by using a score indicating how much appeal effect is given to which user class.

A result of the evaluation process performed by the evaluating unit 135 is reflected in the processes performed by the generating unit 132 and the distributing unit 134 as described above. For example, the generating unit 132 generates a new moving image thumbnail on the basis of an evaluation result obtained by the evaluating unit 135. The distributing unit 134 distributes a moving image thumbnail on the basis of a distribution rate that is adjusted in accordance with the evaluation result obtained by the evaluating unit 135. Specifically, the distributing unit 134 distributes a moving image thumbnail based on a distribution rate that is adjusted so as to preferentially distribute a moving image thumbnail whose score calculated by the evaluating unit 135 is higher.

Acquiring Unit 136

The acquiring unit 136 acquires various kinds of information. Specifically, the acquiring unit 136 acquires information on the usage of a moving image content corresponding to the moving image thumbnail in the user terminal 10 as a distribution destination of the moving image thumbnail generated by the generating unit 132. The information on the usage in the user terminal 10 includes information on the user terminal 10 (that is, the user) and information on the usage of a content in the moving image distribution site.

The acquiring unit 136 acquires information on a user who operates the user terminal 10, from the user terminal 10 that has accessed the moving image distribution site. Specifically, the acquiring unit 136 acquires attribute information, such as gender or age, of the user as the information on the user. The acquiring unit 136 may acquire user information, such as annual income, preference, or residence of the user. The acquiring unit 136 acquires the information on the user on the basis of a cookie or the like transmitted and received through access to the moving image distribution site. The acquiring unit 136 may acquire the user information by receiving the user information from a third party that manages the usage of the network or the user. The acquiring unit 136 stores the acquired user information in the user information storage unit 122.

Furthermore, the acquiring unit 136 acquires information on the usage of a moving image thumbnail or a moving image content in the moving image distribution site. Specifically, the acquiring unit 136 acquires, as the information on the usage, the viewing start rate, the completion rate, or the bookmark rate of the moving image content for each moving image thumbnail. Specifically, the information on the usage of the content is not necessarily limited to the information indicating that the moving image thumbnail or the moving image content is played, but may include information on the usage, such as a state in which the moving image content is not played even though the moving image thumbnail is viewed. The acquiring unit 136 may acquire information on the usage when the moving image content is used via the moving image thumbnail. Consequently, the acquiring unit 136 can acquire information indicating an interconnection between the moving image thumbnail and the moving image content, such as how the moving image content is used because of viewing of the moving image thumbnail.

Furthermore, the acquiring unit 136 acquires the usage of the moving image content for each user attribute. Specifically, the acquiring unit 136 acquires a selection rate or the like for each user attribute, with respect to a user who has clicked the moving image thumbnail. The acquiring unit 136 stores the acquired information on the usage in the usage storage unit 123.

Moreover, the acquiring unit 136 may acquire information other than the information illustrated in FIG. 6 and FIG. 7. For example, the acquiring unit 136 may acquire, as the information on the usage, time information on a moment at which a user selects the moving image thumbnail, information on a duration in which the user views the moving image content, or information on the exit rate of the moving image content. If the acquiring unit 136 acquires the time information on a moment at which the user selects the moving image thumbnail, the generating unit 132 can generate a moving image thumbnail by using the acquired information.

Specifically, because the moving image thumbnail is generated by being clipped out from the moving image content, the time information on a time point at which a click is performed is also used as information for specifying a time point in the moving image thumbnail and information for specifying a time point in the moving image content. Therefore, the generating unit 132 can generate a new moving image content on the basis of the time information.

Learning Unit 137

The learning unit 137 performs learning to optimize a content to be distributed to a user. For example, the learning unit 137 performs learning about a correlation between the appeal effect of a moving image thumbnail corresponding to a certain moving image content and a user class, on the basis of the information acquired by the acquiring unit 136.

For example, it is assumed that the learning unit 137 classifies the user class by two elements "age and gender". Specifically, the learning unit 137 classifies a user who has accessed the moving image distribution site by "age and gender", and determines a user class to which the user belongs. For example, the learning unit 137 classifies the user U11 illustrated in FIG. 6 into a user class of (gender, age)=(male, 20's).

Then, the learning unit 137 learns the degree of the appeal effect to each user class, with respect to a certain moving image thumbnail as a target. As one example, the learning unit 137 counts the number of times the moving image thumbnail is clicked by each user class. Then, the learning unit 137 leans the appeal effect of the target moving image thumbnail by performing statistical processing on the counted number of clicks (that is, the number of times the moving image thumbnail is selected).

Furthermore, the learning unit 137 can learn a user class optimized for a moving image thumbnail through machine learning using a known technique. For example, the learning unit 137 builds a model formula in which correct answer data (in this example, a click on the moving image thumbnail) is on the left side, and each element including a weighted value and the user class is on the right side. Consequently, the learning unit 137 can learn a correlation between the click on the moving image thumbnail and each user class. According to the model formula as described above, the weighted value of the user class who is likely to do a click is increased with an increase in the number of distributions of the moving image thumbnail (that is, the number of samples in the model formula). Therefore, the learning unit 137 can derive the appeal effect of the moving image thumbnail for each user class. Furthermore, the learning unit 137 may link the weighted value in the above-described model formula with the distribution rate that is a rate at which a plurality of moving image thumbnails are distributed to the user class. Through the above-described learning process, a certain moving image thumbnail is more likely to be distributed to a user class for which the appeal effect of the moving image thumbnail is expected to increase.

In the course of the learning process, the learning unit 137 may perform adjustment such that a moving image thumbnail is distributed to random user classes, with respect to a predetermined percentage of distributions. For example, if optimized moving image thumbnails are distributed in response to all distribution requests, only a limited moving image thumbnail among a plurality of moving image thumbnails may be continuously distributed. For example, if there is a great difference in the appeal effect among the moving image thumbnails, the learning unit 137 may learn to distribute only a moving image thumbnail with the highest appeal effect. To prevent overlearning as described above, the learning unit 137 may perform a process of randomly distributing moving image thumbnails among a plurality of moving image thumbnails with respect to a predetermined percentage of distributions, in response to distribution requests.

Then, the learning unit 137 may calculate an index value for each moving image thumbnail on the basis of a result of learning. For example, the learning unit 137 calculates an appeal effect of each moving image thumbnail as a predetermined score. Then, the learning unit 137 causes the generating unit 132 to generate an alternative moving image thumbnail for a moving image thumbnail whose calculated score is equal to or lower than a predetermined threshold. As described above, by eliminating a moving image thumbnail with a lower appeal effect, a moving image thumbnail with a higher appeal effect is clipped out. Alternatively, the generating unit 132 may generate a moving image thumbnail whose index value for a user as a distribution destination is expected to meet a predetermined condition, on the basis of a result of machine learning. The predetermined condition may be a condition in which the index value for the user as a distribution destination is higher than a predetermined threshold. For example, the generating unit 132 preferentially generates a moving image thumbnail whose index value for a user as a distribution destination is the highest on the basis of a result of the learning process. As described above, the generating unit 132 can generate a moving image thumbnail with a high appeal effect or preferentially select a moving image thumbnail with a high appeal effect by using a result of the learning process performed by the learning unit 137. Consequently, it is possible to encourage a user to do viewing. The score may be calculated as a total score for all users or for each user class, with respect to each moving image thumbnail. The score is used for evaluation by the evaluating unit 135.

A result of learning performed by the learning unit 137 is stored for each moving image content. The learning result stored for each moving image content may be used for other moving image contents. For example, if a plurality of moving image contents are a set of series dram or the like, the learning unit 137 may use the learning result of a single moving image content for other moving image contents of the same series. Consequently, in some cases, the generating unit 132 may be able to generate a moving image content with a high appeal effect before distribution of the moving image content. For example, if a moving image thumbnail clipped out at a predetermined time period has received a high evaluation in a certain moving image content, the generating unit 132 may perform a process of generating a moving image thumbnail by using a content around the same specific time period in a different moving image content.

Furthermore, in the above-described learning process, various known techniques may be used. For example, it may be possible to use, in the learning process, a method used in so-called targeted advertising in which an advertisement content is distributed to a specific user class in the case of advertisement distribution via the network.

4. Flow of Process

Figure 10:
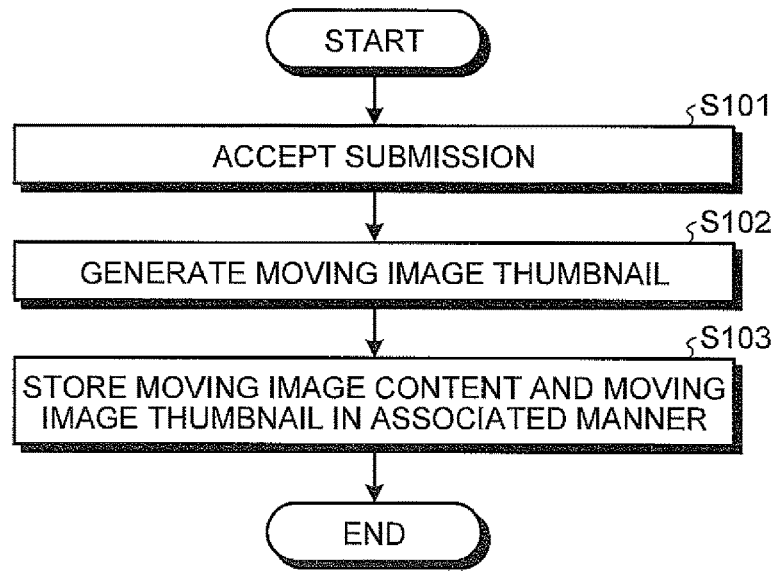
FIG. 10 is a first flowchart illustrating the flow of a process performed by the generation apparatus according to the embodiment.
Figure 11:
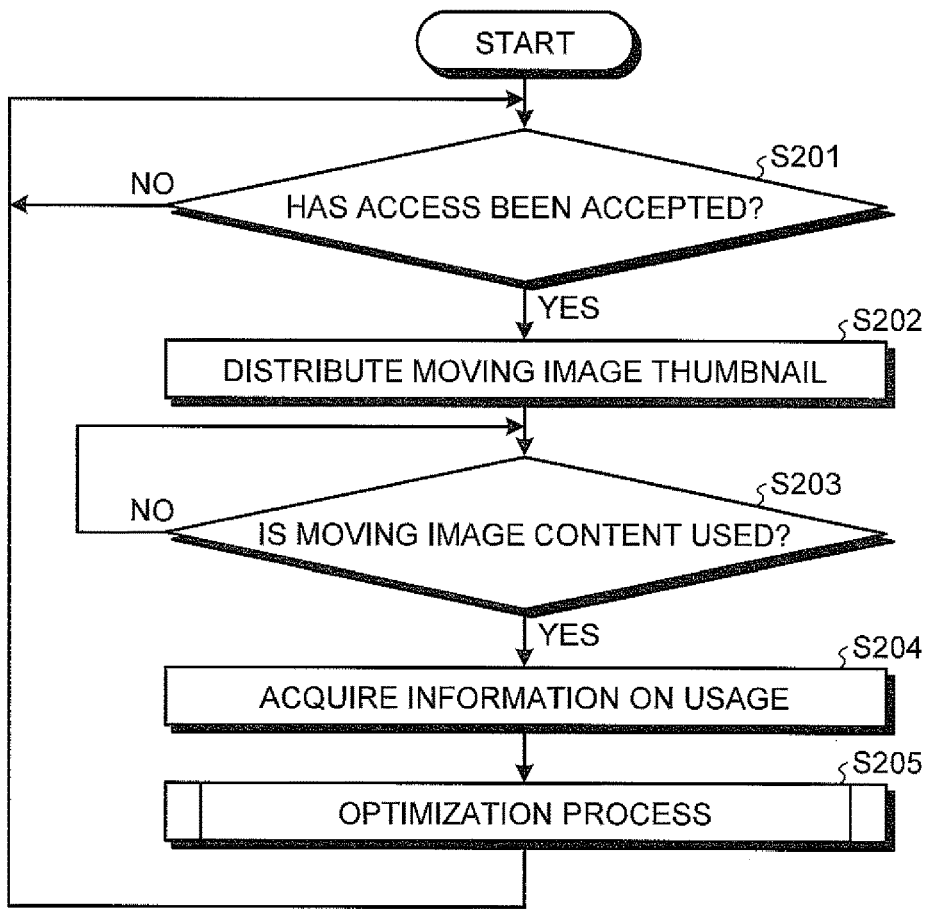
FIG. 11 is a second flowchart illustrating the flow of the process performed by the generation apparatus according to the embodiment.
Figure 12:
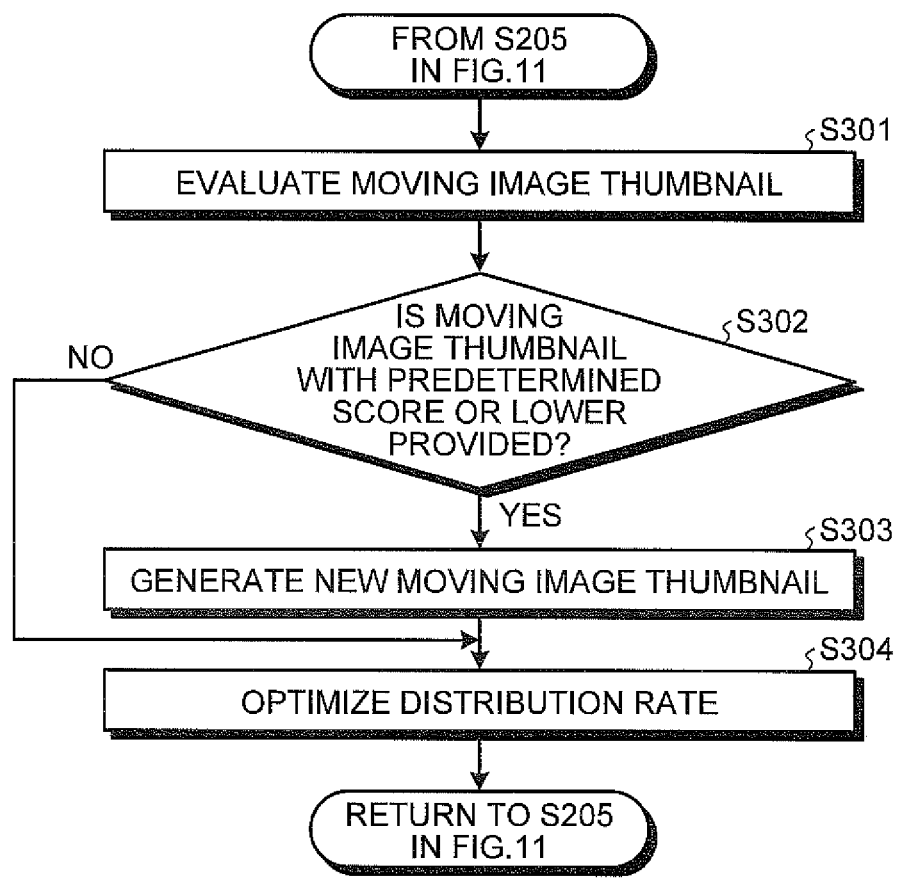
FIG. 12 is a third flowchart illustrating the flow of the process performed by the generation apparatus according to the embodiment.

The flow of processes performed by the generation apparatus 100 according to the embodiment will be described below with reference to FIG. 10 to FIG. 12. First, the flow of a process of generating a moving image thumbnail from a submitted moving image content will be described with reference to FIG. 10. FIG. 10 is a first flowchart illustrating the flow of the process performed by the generation apparatus 100 according to the embodiment.

As illustrated in FIG. 10, the submission accepting unit 131 accepts submission of a moving image content (Step S101). The generating unit 132 generates a moving image thumbnail as a partial moving image used as a key image of the moving image content (Step S102). The generating unit 132 stores the moving image content and the generated moving image thumbnail in an associated manner (Step S103).

A process subsequent to the process illustrated in FIG. 10 will be described below. FIG. 11 is a second flowchart illustrating the flow of the process performed by the generation apparatus 100 according to the embodiment.

The receiving unit 133 determines whether the moving image distribution site has accepted an access from the user (Step S201). If the access has not been accepted (NO at Step S201), the receiving unit 133 waits until the access is accepted.

If the access has been accepted (YES at Step S201), the distributing unit 134 distributes a moving image thumbnail in accordance with a distribution request received by the receiving unit 133 (Step S202). Subsequently, the acquiring unit 136 determines whether a moving image content is used in the moving image distribution site (Step S203). If the moving image content is not used (NO at Step S203), the acquiring unit 136 waits until the moving image content is used.

If the moving image content is used (YES at Step S203), the acquiring unit 136 acquires information on the usage (Step S204). Subsequently, the learning unit 137 performs an optimization process on the basis of the acquired information (Step S205). Details of the optimization process will be described below with reference to FIG. 12. After the optimization process, the process returns to Step S201, and the above-described process is repeated.

The optimization process will be described in detail below. FIG. 12 is a third flowchart illustrating the flow of the process performed by the generation apparatus 100 according to the embodiment.

The learning unit 137 evaluates the moving image thumbnail on the basis of the information acquired by the acquiring unit 136 (Step S301). The learning unit 137 determines whether a moving image thumbnail with a predetermined score or lower is provided (Step S302).

If a moving image thumbnail with the predetermined score or lower is provided (YES at Step S302), the learning unit 137 causes the generating unit 132 to generate a new moving image thumbnail (Step S303).

Then, the learning unit 137 optimizes the distribution rates of a plurality of moving image thumbnails corresponding to the moving image content (Step S304). Even if a moving image thumbnail with the predetermined score or lower is not provided at Step S302 (NO at Step S302), the process proceeds to Step S304.

5. Modifications

The above-described generation apparatus 100 may be embodied in various different forms other than the above-described embodiment. Other embodiments of the generation apparatus 100 will be described below.

5-1. Social Graph

In the above-described embodiment, a process has been described in which information on an attribute of a user is acquired as the user information, and a moving image thumbnail optimized for each user class is generated. The user may be classified by a different element instead of an attribute, such as age.

Figures 13, 14:
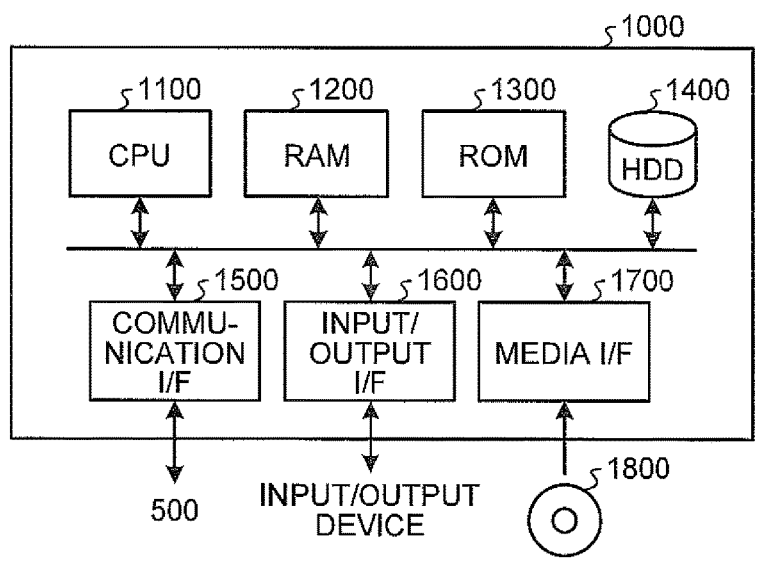
FIG. 13 is a diagram illustrating an example of a user information storage unit according to a modification.
FIG. 14 is a diagram illustrating an example of a hardware configuration of a computer that implements functions of the generation apparatus.

For example, the user information storage unit 122 may store therein information on a social graph of the user. This will be described with reference to FIG. 13. FIG. 13 is a diagram illustrating an example of the user information storage unit 122 according to a modification.

As illustrated in FIG. 13, the user information storage unit 122 according to the modification includes items such as "user ID" and "social graph attribute".

The "user ID" corresponds to the item "user ID" illustrated in FIG. 6. The "social graph attribute" is information for identifying a social graph to which the user belongs.

Specifically, FIG. 13 illustrates an example in which a user U21 identified by a user ID "U21" belongs to a social graph attribute identified by "AAA".

The social graph is information indicating correlations (connections) of users in a network environment. For example, the social graph is constructed by connections of information registered in a social networking service (SNS), information published in the SNS, and the like due to participation in the SNS. As an attribute of the social graph, a classification, such as social status of the user, property (real estate, a car, or the like) expected to be owned by the user, or connections of friends, may be used.

The generation apparatus 100 can optimize a moving image thumbnail to be distributed for each social graph attribute, by performing the learning process of the above-described embodiment for each social graph attribute. In the example illustrated in FIG. 13, a moving image thumbnail that is evaluated as having a high effect to the user U21 is more likely to be distributed to a user U25 or a user U26 belonging to the same social graph attribute.

As described above, the generation apparatus 100 can optimize a moving image thumbnail by using a classification by the social graph attribute indicating the social connections, in addition to a classification by an attribute, such as age, of an individual user. Consequently, the generation apparatus 100 can generate and distribute a moving image thumbnail expected to achieve a high appeal effect to a wide range of user classes.

5-2. Display of Moving Image Thumbnail

In FIG. 2, an example has been described in which when a process of expressing the intention to do viewing, such as mouseover, is performed on a still image thumbnail displayed in a list on the moving image distribution site, viewing of the moving image thumbnail is started. However, the generation apparatus 100 may display a moving image thumbnail by a different method.

For example, the generation apparatus 100 may perform a process of randomly playing a moving image thumbnail in an automatic manner or in response to operation from among key images of the moving image content displayed in a list on the moving image distribution site. Specifically, a user can view the moving image thumbnail without performing a process of overlapping the still image thumbnail and the mouse cursor. Consequently, the user can view the moving image thumbnails as if the user changes channels of television. If the user is interested in a certain moving image content, the user can transmit a distribution request for the moving image content by expressing the intention to do viewing by any method, such as a click, a gesture, or voice, with respect to a corresponding moving image thumbnail.

5-3. Generation of Moving Image Thumbnail

In the above-described embodiment, it has been described that the generating unit 132 generates a moving image thumbnail used as a key image of a moving image content from a part of the moving image content. However, a part of the moving image content need not be a consecutive part. For example, the generating unit 132 may clip out different partial moving images of five seconds at two positions as parts of a moving image content, and may generate a moving image thumbnail by combining the two partial moving images. Even in this case, it is possible to acquire information on a time point at which the moving image thumbnail is clicked, so that the evaluating unit 135 can perform an optimization process or the like as described in the embodiment. As described above, even when a moving image content includes a plurality of time points at which a click is likely to be performed, the generation apparatus 100 can generate a moving image thumbnail from a plurality of partial moving images containing parts around the time points. Consequently, the generation apparatus 100 can flexibly generate a moving image thumbnail in accordance with the appeal effect of the moving image thumbnail or the like.

5-4. Web Server

In the above-described embodiment, an example has been described in which the generation apparatus 100 provides a moving image distribution site. However, the moving image distribution site may be provided by a web server different from the generation apparatus 100. In this case, the generation apparatus 100 distributes a predetermined content to the web server in accordance with a request transmitted from the web server.

5-5. Acquisition of Usage

As described above, the acquiring unit 136 can acquire information indicating a time point to which the user views the moving image content and a time point at which the user exits from the moving image content. Then, the evaluating unit 135 may evaluate the appeal effect of the moving image thumbnail in accordance with a viewing time of the moving image content, in addition to using the start of viewing of the moving image content as an index value. Furthermore, the acquiring unit 136 may acquire a stay time during which a line of sight stays on the moving image thumbnail and the moving image content by an eye tracking method for analyzing movement of the line of sight of the user on the moving image distribution site. As described above, the acquiring unit 136 can acquire various kinds of information as the information on the usage.

5-6. Acquisition of User Information

In the generation process according to the above-described embodiment, an example has been described in which the acquiring unit 136 acquires the user information when the user terminal 10 accesses the moving image distribution site provided by the generation apparatus 100. However, the acquiring unit 136 may acquire the user information from the user terminal 10 other than when the user terminal 10 accesses the moving image distribution site provided by the generation apparatus 100. This will be described below.

For example, if the moving image distribution site accessed by the user terminal 10 is provided by a predetermined web server managed by the same management apparatus that manages the generation apparatus 100 (for example, a front-end server of the generation apparatus 100), the acquiring unit 136 can acquire the user information from the user terminal 10. Specifically, when accessing a moving image distribution site provided by a certain web server managed by the management apparatus, the user terminal 10 transmits the user information on the user terminal 10 to the management apparatus. This is realized by transmitting a cookie from the user terminal 10 to the management apparatus. In this case, the user information transmitted by the user terminal 10 is transmitted to the generation apparatus 100 via the management apparatus. Consequently, the acquiring unit 136 of the generation apparatus 100 can acquire the user information on the user terminal 10 without via the generation apparatus 100. The acquiring unit 136 can identify each of the user terminals 10 by checking the above-described cookie or the device ID that is set in advance in the user terminal 10.

5-7. User Class

In the above-described embodiment, an example has been described in which the generation apparatus 100 classifies a user into a predetermined user class on the basis of the user attribute information. For example, in the embodiment, an example has been described in which the generation apparatus 100 classifies the user into a user class by "age" or "gender". The generation apparatus 100 may classify the user by using a different kind of user information. For example, the generation apparatus 100 may classify the user by using "residence", "annual income", or "preference" included in the user information. Furthermore, the generation apparatus 100 may arbitrarily set a user class by combining elements in the user information. Consequently, the generation apparatus 100 can generate a moving image thumbnail appropriate for a wide range of user classes.

6. Hardware Configuration

The generation apparatus 100 according to the above-described embodiment is implemented by, for example, a computer 1000 with a configuration as illustrated in FIG. 14. In the following, a description will be given by using the generation apparatus 100 as an example. FIG. 14 is a diagram illustrating an example of a hardware configuration of the computer 1000 that implements the functions of the generation apparatus 100. The computer 1000 includes a CPU 1100, a RAM 1200, a ROM 1300, an HDD 1400, a communication interface (I/F) 1500, an input/output I/F 1600, and a media I/F 1700.

The CPU 1100 operates based on a program stored in the ROM 1300 or the HDD 1400, and controls each of units. The ROM 1300 stores therein a boot program executed by the CPU 1100 when the computer 1000 is activated, a program that depends on the hardware of the computer 1000, and the like.

The HDD 1400 stores therein a program executed by the CPU 1100, data used by the program, and the like. The communication I/F 1500 receives data from other devices via a communication network 500 (corresponding to the network N illustrated in FIG. 3), sends the data to the CPU 1100, and transmits data generated by the CPU 1100 to other devices via the communication network 500.

The CPU 1100 controls an output device, such as a display or a printer, and an input device, such as a keyboard or a mouse, via the input/output I/F 1600. The CPU 1100 acquires data from the input device via the input/output I/F 1600. The CPU 1100 outputs generated data to the output device via the input/output I/F 1600.

The media I/F 1700 reads a program or data stored in a recording medium 1800, and provides the program or the data to the CPU 1100 via the RAM 1200. The CPU 1100 loads the program onto the RAM 1200 from the recording medium 1800 via the media I/F 1700, and executes the loaded program. The recording medium 1800 may be, for example, an optical recording medium such as a digital versatile disk (DVD) or a phase change rewritable disk (PD), a magneto-optical recording medium such as a magneto-optical disk (MO), a tape medium, a magnetic recording medium, a semiconductor memory, or the like.

For example, when the computer 1000 functions as the generation apparatus 100 according to the embodiment, the CPU 1100 of the computer 1000 implements the functions of the control unit 130 by executing the program loaded on the RAM 1200. Furthermore, the HDD 1400 stores therein data stored in the storage unit 120. While the CPU 1100 of the computer 1000 reads the program from the recording medium 1800 and executes the program, the program may be acquired from other devices via the communication network 500 as another example.

7. Others

Of the processes described in the embodiment, all or part of a process described as being performed automatically may also be performed manually. Alternatively, all or part of a process described as being performed manually may also be performed automatically by known methods. In addition, the processing procedures, specific names, and information including various kinds of data and parameters illustrated in the above-described document and drawings may be arbitrarily changed unless otherwise specified. For example, various kinds of information illustrated in the drawings are not limited to the information illustrated in the drawings.

The components of the apparatuses illustrated in the drawings are functionally conceptual and do not necessarily have to be physically configured in the manner illustrated in the drawings. In other words, specific forms of distribution and integration of the apparatuses are not limited to those illustrated in the drawings, and all or part of the apparatuses may be functionally or physically distributed or integrated in arbitrary units depending on various loads or use conditions. For example, the acquiring unit 136 and the learning unit 137 illustrated in FIG. 4 may be integrated with each other. Furthermore, for example, the information stored in the storage unit 120 may be stored in an external storage device via the network N.

Moreover, in the above-described embodiment, an example has been described in which, for example, the generation apparatus 100 performs an accepting process of accepting submission of a moving image content, a generation process of generating a moving image thumbnail to be distributed, and a distribution process of distributing the moving image thumbnail. However, the above-described generation apparatus 100 may be separated into an accepting device that performs the accepting process, a generating device that performs the generation process, and a distributing device that performs the distribution process. In this case, the accepting device includes the submission accepting unit 131. The generating device includes the generating unit 132 and the evaluating unit 135. The distributing device includes the receiving unit 133 and the distributing unit 134. In this case, the above-described processes performed by the generation apparatus 100 are implemented by the generation processing system 1 including the accepting device, the generating device, and the distributing device.

Furthermore, the embodiments and the modifications described above may be combined appropriately as long as the processes do not conflict with each other.

8. Effects

As described above, the generation apparatus 100 according to the embodiment includes the generating unit 132 and the acquiring unit 136. The acquiring unit 136 acquires information on usage of a moving image content corresponding to a moving image thumbnail used as a key image of the moving image content in the user terminal 10 that is a distribution destination of the moving image thumbnail. The generating unit 132 generates a moving image thumbnail corresponding to the moving image content on the basis of the information acquired by the acquiring unit 136.

As described above, the generation apparatus 100 according to the embodiment acquires the usage of the content by the user, and generates a moving image thumbnail corresponding to the acquired information. Consequently, the generation apparatus 100 can generate a moving image thumbnail personalized for the user. Therefore, according to the generation apparatus 100, it is possible to provide a moving image thumbnail with a high appeal effect to the user, enabling to encourage the user to view a distributed content.

Furthermore, the acquiring unit 136 acquires, as the information on the usage, information on a user corresponding to the user terminal 10. The generating unit 132 generates a moving image thumbnail corresponding to each user class classified by user attribute information, on the basis of the acquired information on the user.

Consequently, the generation apparatus 100 according to the embodiment can flexibly generate a moving image thumbnail corresponding to various user classes. Therefore, the generation apparatus 100 can generate and select a moving image thumbnail effective to users with the similar attributes. That is, the generation apparatus 100 can generate a moving image thumbnail targeted to a user.

Moreover, the acquiring unit 136 acquires, as the information on the user, a social graph that is information indicating a correlation of users in a network environment. The generating unit 132 generates the moving image thumbnail corresponding to each user class classified by the social graph.

As described above, the generation apparatus 100 according to the embodiment classifies a user into a user class by using various kinds of user information. Consequently, the generation apparatus 100 can generate a moving image thumbnail corresponding to a social graph attribute that is a user class having a common interest. Therefore, it is possible to further improve the appeal effect of a moving image thumbnail to be generated.

The generation apparatus 100 according to the embodiment further includes the evaluating unit 135 that evaluates a moving image thumbnail by an index value (score) indicating an impact of the moving image thumbnail on viewing of the moving image content, on the basis of the information acquired by the acquiring unit 136. Furthermore, the generating unit 132 generates a moving image thumbnail from the moving image content on the basis of a result of evaluation performed by the evaluating unit 135.

As described above, the generation apparatus 100 according to the embodiment evaluates the generated moving image thumbnail and generates a moving image thumbnail based on the evaluation result. Consequently, the generation apparatus 100 can eliminate, for example, a moving image thumbnail with a low evaluation, and can generate an alternative moving image thumbnail. Therefore, it is possible to improve the effect achieved by the moving image thumbnails as a whole.

Furthermore, the evaluating unit 135 performs machine learning about a correlation between the index value and information on a user who operates the user terminal 10. The generating unit 132 generates a moving image thumbnail for which the index value with respect to a user as a distribution destination is expected to meet a predetermined condition, on the basis of a result of the machine learning.

As described above, the generation apparatus 100 according to the embodiment performs machine learning on the generated moving image thumbnail, and optimizes the effect of the moving image thumbnail. For example, the generating unit 132 generates a moving image thumbnail for which the index value with respect to the user as a distribution destination is expected to be the highest. Consequently, the generation apparatus 100 can preferentially generate and select a moving image thumbnail with a high evaluation. Therefore, it is possible to encourage use of a moving image content, such as the moving image distribution site, by the moving image thumbnail.

The generation apparatus 100 according to the embodiment distributes the moving image thumbnail to the user terminal 10, in accordance with a distribution rate that is calculated based on the result of the evaluation performed by the evaluating unit 135.

As described above, the generation apparatus 100 according to the embodiment can adjust a rate of a moving image thumbnail to be distributed, on the basis of the evaluation of the moving image thumbnail. Consequently, the generation apparatus 100 can optimize not only the generation process but also the effect of distribution of the already-generated moving image thumbnail.

Furthermore, the acquiring unit 136 acquires, as the information on the usage, at least one of a rate at which a user selects the moving image thumbnail, a completion rate of a moving image content viewed via the moving image thumbnail, and a bookmark rate of the moving image content. The generating unit 132 generates a moving image thumbnail on the basis of the information on the usage acquired by the acquiring unit 136.

As described above, the generation apparatus 100 according to the embodiment acquires various kinds of information generated in accordance with use by the user, and generates a moving image thumbnail on the basis of the acquired information. Consequently, the generation apparatus 100 can generate a moving image thumbnail from various viewpoints. For example, the generation apparatus 100 may generate a moving image thumbnail expected to most encourage the start of viewing, or a moving image thumbnail expected to achieve the highest completion rate.

Furthermore, "a unit" recited in the claims may be replaced with "a section, a module, or a means" or "a circuit". For example, the acquiring unit may be replaced with an acquiring means or an acquiring circuit.

According to an embodiment, it is possible to encourage a user to view a distributed content.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A server that composes moving thumbnails tailored to users, comprising:
   a communicator that:
      acquires information on usage of a moving image content corresponding to a first thumbnail used as a key image of the moving image content in a terminal device that is a distribution destination of the first thumbnail; and
      acquires a time point during the first thumbnail when the moving image content is requested; and
   a processor configured to:
      select a first portion of the moving image content corresponding to the time point;
      select a second portion of the moving image content based on the acquired information, the second portion of the moving image content being absent from the first thumbnail; and
      generate a new moving image thumbnail in which the second portion of the moving image content is played, and the first portion of the moving image content is played at a middle point or immediately after a start point of the new moving image thumbnail.

2. The server according to claim 1, wherein
   the communicator acquires, as the information on the usage, information on a user corresponding to the terminal device, and
   the processor generates new moving image thumbnails corresponding to each user class classified by user attribute information, based on the acquired information on the user.

3. The server according to claim 2, wherein
   the communicator acquires, as the information on the user, a social graph indicating a correlation of users in a network environment, and
   the processor generates new moving image thumbnails corresponding to each user class classified by the acquired social graph.

4. The server according to claim 1, wherein the processor is further configured to:
   evaluate the first thumbnail by an index value indicating an impact of the first thumbnail on viewing of the moving image content, based on the acquired information; and
   generate the new moving image thumbnail based on a result of the evaluation.

5. The server according to claim 4, wherein the processor is further configured to:
   perform machine learning about a correlation between the index value and information on a user who operates the terminal device; and
   generate a second new moving image thumbnail for which the index value with respect to a user as a distribution destination is expected to meet a predetermined condition, based on a result of the machine learning.

6. The server according to claim 4, wherein the processor is further configured to distribute the new moving image thumbnail to the terminal device in accordance with a distribution rate that is calculated based on the result of the evaluation.

7. The server according to claim 1, wherein
the communicator acquires, as the information on the usage, at least one of a rate at which a user selects the first thumbnail, a completion rate of a moving image content viewed via the first thumbnail, and a bookmark rate of the moving image content, and
the processor generates the new moving image thumbnail based on the acquired information on the usage.

8. A method of composing moving thumbnails tailored to users, implemented by a computer, comprising:
acquiring information on usage of a moving image content corresponding to a first thumbnail used as a key image of the moving image content in a terminal device that is a distribution destination of the first thumbnail;
acquiring a time point during the first thumbnail when the moving image content is requested;
selecting a first portion of the moving image content corresponding to the time point;
selecting a second portion of the moving image content based on the acquired information, the second portion of the moving image content being absent from the first thumbnail; and
generating, using the computer, a new moving image thumbnail in which the second portion of the moving image content is played, and the first portion of the moving image content is played at a middle point or immediately after a start point of the new moving image thumbnail.

9. A non-transitory computer readable storage medium having stored therein a generation program causing a computer to execute a process comprising:
acquiring information on usage of a moving image content corresponding to a first thumbnail used as a key image of the moving image content in a terminal device that is a distribution destination of the first thumbnail;
acquiring a time point during the first thumbnail when the moving image content is requested;
selecting a first portion of the moving image content corresponding to the time point;
selecting a second portion of the moving image content based on the acquired information, the second portion of the moving image content being absent from the first thumbnail; and
generating a new moving image thumbnail in which the second portion of the moving image content is played, and the first portion of the moving image content is played at a middle point or immediately after a start point of the new moving image thumbnail.

* * * * *